3,202,651
**PROCESS FOR THE PRODUCTION OF
o-HYDROXY AZO COMPOUNDS**
Fritz Suckfüll, Leverkusen, Helmut Dittmer, Cologne-Stammheim, and Ernst Messmer, Leverkusen, Germany, assignors to Farbenfabriken Bayer Aktiengesellschaft, Leverkusen, Germany, a German corporation
No Drawing. Filed Oct. 10, 1960, Ser. No. 61,354
Claims priority, application Germany, Oct. 24, 1959,
F 29,698; Dec. 2, 1959, F 29,992
4 Claims. (Cl. 260—194)

The invention relates to a process for the production of o-hydroxy azo compounds; more particularly it concerns the manufacture of o-hydroxy azo compounds by reacting a diazotate in a solution or suspension with a diazonium compound, whereby one of the two starting components must belong to the naphthalene series.

In the most important technical application of diazo compounds, i.e. in azo dyestuff coupling, the nitrogen atom of the diazonium group is contained in the final product. In a number of other reactions, for example the Sandmeyer reactions, the nitrogen atom of the diazonium group is completely split off. In addition, various other reactions of diazo compounds are known in which, on average, exactly half of the nitrogen of the diazonium group is split off. According to Vorlander [Annalen der Chemie 320, page 122 (1902)], the action of an ammoniacal cuprous salt solution leads to the formation of symmetrical azo compounds. Occasionally, the formation of symmetrical azo compounds is also found as a side reaction in Sandmeyer's synthesis [cf. Erdmann, Annalen der Chemie 272, page 144 (1892)]. The production of symmetrical azonaphthalenes by the reaction of diazo compounds of the naphthalene series with salts of sulphurous acid has been described in German patent specification No. 78,225.

According to the process of German patent specification No. 71,178 likewise half of the nitrogen of the diazonium group is split off, on average, during the decomposition of diazo compounds from special aminodisazo dyestuffs. The reaction takes place in a weakly alkaline to weakly acid solution, and only conjectures are given regarding the nature of the resulting reaction product. Subsequent investigations made by Hodgson (Journal Chem. Soc., 1943, page 379) into the decomposition of simple diazo compounds in the vicinity of the neutral point disclosed that hydroxyazo compounds were formed. In contrast to the course of reaction in a strongly acid solution, the hydroxy compound formed by decomposition of the diazonium group is here coupled by a molecule of not yet decomposed diazo compound with the formation of the hydroxy-azo dyestuff. As a final result, therefore, half of the nitrogen of the original diazo compound has been split off.

It has now been found, that a valuable technically different reaction is obtained, which splits off half of the diazo-nitrogen, when diazo compounds of the naphthalene series are reacted in a distinctly alkaline solution. Also in this case, there are formed hydroxy-azo compounds; however, while in the reaction described by Hodgson the hydroxy group takes the place of a diazo group initially present, the hydroxy group, in the reaction upon which the present process is based, takes the o-position to the initial diazo group. Thus, for example, by the action of alkali on the diazo compound of 2-aminonaphthalene-3,6-disulphonic acid there is formed a derivative of 1-hydroxynaphthalene-3,6-disulphonic acid:

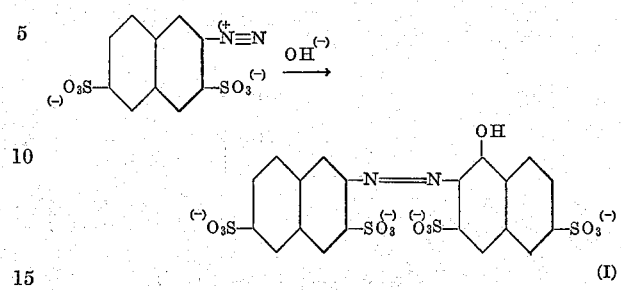

(I)

Inversely, there are obtained from the diazo compounds of 1-aminonaphthalene-sulphonic acids, azo compounds of the corresponding 2-hydroxynaphthalene derivatives:

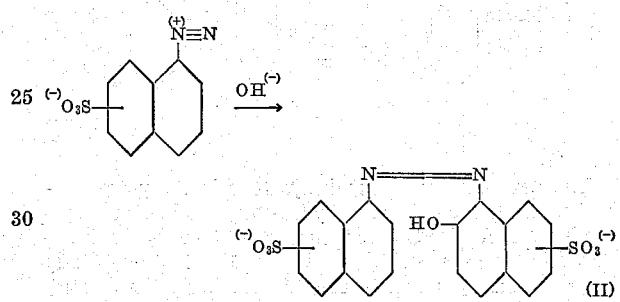

(II)

In the course of further investigations it has been found that this is only a special case of a reaction having a much wider range of application. The most general case is the reaction of a diazotate with a diazonium compound whereby one of the two components must belong to the naphthalene series. Thus, there is formed from the diazotate R—N=N—O$^{(-)}$ and, for example, a 1-diazonaphthalene compound, a 2-hydroxynaphthalene dyestuff

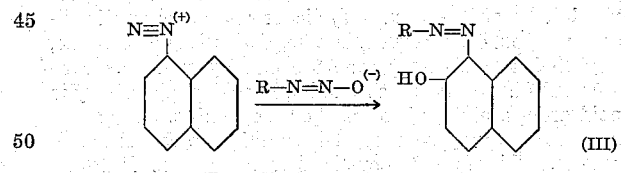

(III)

(R=radical of the diazotate)

furthermore from the diazotate R—N=N—O$^{(-)}$ and a 2-diazonaphthalene compound, a 1-hydroxynaphthalene dyestuff is formed:

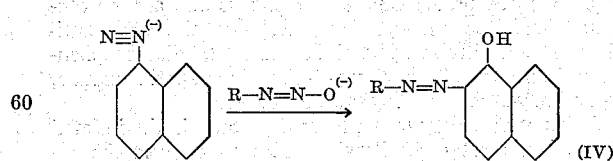

(IV)

In addition, hydroxy-azo compounds may be obtained by the action of alkali on the corresponding diazonaphthalene compound (i.e. in the absence of a diazotate), for example according to reaction schemes (I) and (II). In general, these byproducts may be separated off by suitable isolation or also by re-dissolving. It is moreover possible to reduce the portion of undesired compound, for example, by varying the proportions of diazotate R—N=N—O$^{(-)}$ and diazonium compound.

From a diazonium compound

and a diazotate of the naphthalene series, dyestuffs of the same structure (in the case where $R_1$ equals R) or of a similar composition may be obtained:

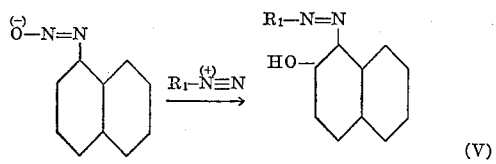

($R_1$ = radical of a diazonium compound)

or

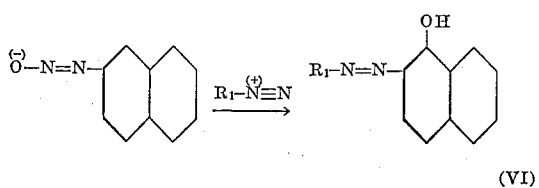

(VI)

The new process leads always to o-hydroxy-azo dyestuffs. In some of the 1-hydroxynaphthalene-azo dyestuffs thus obtained, a second azo group may be introduced in the para-position to the resulting hydroxy group by a secondary reaction due to remaining diazo compound. In these exceptional cases, however, difficulties arise also in conventional dyestuff production, since the normal coupling of the corresponding 1-hydroxynaphthalenes primarily yields chiefly para-coupling and in addition also ortho-coupling and double coupling. According to the new process the simple para-hydroxy-azo dyestuff does not appear at all; a tendency of the o-hydroxy-azo dyestuff to further coupling can be counteracted by varying the proportion of diazotate and diazonium component and by stopping the reaction in time.

The diazotates suitable for the new process may be derived from aromatic carbocyclic or also heterocyclic diazo compounds. In the first case, derivatives of benzene, naphthalene and anthracene are equally suitable. Further substituents such as sulphuric acid and carboxylic acid groups, alkyl, nitro, halogen, acylamino, azo groups and the like may be present in addition to the diazotate groups. Of the heterocyclic diazotates there is to be mentioned, for example, the diazotate of dehydro-thio-toluidine-disulphonic acid.

Diazotates of the syn-series have certain advantages for this reaction, but diazotates of the anti-series may, in principle, also be used. Suitable diazotates are, among others: 4-sulphophenyl-syn-diazotate, 4-sulphophenyl-anti-diazotate, 4-nitrophenyl-anti-diazotate, 2,5-dichlorophenyl-anti-diazotate, 2-methoxy-4-nitrophenyl-anti-diazotate, 2-methoxy-5-chlorophenyl-anti-diazotate.

It is not necessary to use these diazotates in the isolated form. In most cases it will suffice to convert the diazonium compounds upon which the diazotates are based before the further reaction (of the diazotates) into diazotates by means of sodium carbonate or sodium hydroxide solution. Suitable for this purpose are for example the diazonium compounds of aniline, 2-methoxy-aniline, 4-benzoyl-aminoaniline, 4-amino-azobenzene-4'-sulphonic acid, dehydrothio-toluidine-disulphonic acid, 2-aminonaphthalene-6-sulphonic acid, 6-nitro-2-aminonaphthalene-4,8-disulphonic acid, 1-aminoanthraquinone and the like.

Suitable diazonium compounds are for example those of the benzene, naphthalene, anthracene and heterocyclic series, inter alia the diazonium compounds of 1-aminonaphthalene, 1-aminonaphthalene-4-sulphonic acid, 1-aminonaphthalene-6-sulphonic acid, 1-aminonaphthalene-3,6- or -3,7- or -4,7-disulphonic acid, 2-aminonaphthalene-3-carboxylic acid, 1-aminonaphthalene-3,6,8-trisulphonic acid, aniline, 4-benzoylaminoaniline, 4-nitroaniline, 4-aminoazobenzene-4'-sulphonic acid, dehydrothiotoluidine-disulphonic acid, 1-aminoanthraquinone, 8-aminoquinoline-5-sulphonic acid.

The reaction is carried out in general, in an aqueous solution at temperatures between 0° and 60° C., preferably at 0°–25° C. In special cases it may be advantageous to use organic solvents, for example, alcohol. The alkali concentration required for the formation of diazotate can be easily established by preliminary experiments. In general, pH of more than 7, preferably between 9 and 12, are indicated for the further reaction. However, the further reaction may also be carried out at lower pH values, for example at 5–7, if under these conditions the diazotate to be employed is re-converted only slowly into the corresponding diazonium compound.

In the normal case, the proportion of the starting components, i.e. of diazo compound and diazotate, will be the stoichiometric proportion, but it may also be a multiple of the stoichiometric proportion of one or the other starting component, especially when using expensive individual components or also in order to obtain more favourable yields.

The reaction sets in with the splitting off of nitrogen which is completed after a few hours, in special cases even after a few minutes. The reaction products are isolated if desired after the addition of salt or acid, by filtering off with suction.

The o-hydroxy-azo compounds obtainable according to the new process are partly known or obtainable by known processes; some are new. They may be used themselves as azo dyestuffs or also serve as intermediate products for the synthesis of polyazo dyestuffs.

The following examples are given for the purpose of illustrating the invention without, however, limiting it thereto.

*Example 1*

60.0 parts by weight (0.2 mol) of 2-aminonaphthalene-3,7-disulphonic acid are diazotized in conventional manner with 55 parts by volume of hydrochloric acid 19° Bé. and 13.8 parts by weight of sodium nitrite. To a suspension of the diazonium compound (appr. 1400 parts by volume), 276 parts by volume of a 20% sodium carbonate solution are added in one jet at room temperature. The reaction sets in with strong foaming and is terminated at pH 9.7 after a few minutes. The resulting hydroxy-azo dyestuff is separated out by the addition of 350 parts by weight of sodium chloride and isolated. The dried dyestuff is a dark brown powder which dissolves in water with a red colour, in concentrated sulphuric acid with a red-violet colour. It corresponds to the formula

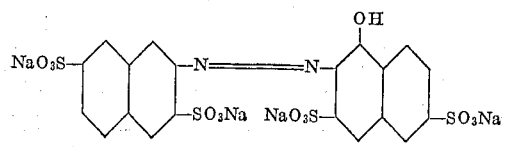

and is identical with the control dyestuff obtainable from diazotized 2-aminonaphthalene-3,7-disulphonic acid and 1-hydroxynaphthalene-3,7-disulphonic acid.

In a similar manner the hydroxy-azo dyestuffs listed on the right hand side of the following table are obtained from the diazonium compounds of the aminonaphthalene compounds given in each case on the left hand side by the action of a sodium carbonate solution. In these examples, the reaction periods lie between a few minutes and several hours as can easily be established by observing the diazo reaction.

separated out with potassium chloride and isolated. The dry dyestuff is a dark red powder which dissolvess in water with a red colour, in concentrated sulphuric acid with a violet colour. It corresponds to the formula

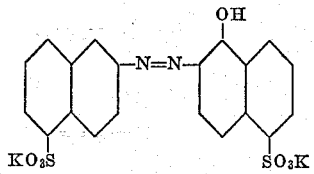

| | | Colour of solution |
|---|---|---|
| (structure) | (structure) | Red (water). |
| (structure) | (structure) | Do. |
| (structure) | (structure) | Do. |
| (structure) | (structure) | Do. |
| (structure) | (structure) | Do. |
| (structure) | (structure) | Brown-red (pyridine). |

Example 2

44.6 parts by weight (0.2 mol) of 2-aminonaphthalene-5-sulphonic acid are diazotized as usual with 55 parts by volume of hydrochloric acid 19° Bé. and 13.8 parts by weight of sodium nitrite. A suspension of the diazonium compound (appr. 1400 parts by volume) is added at 0° C. to 55 parts by volume of 10 N sodium hydroxide solution. The dyestuff formation sets in with the evolution of gas and is terminated at pH 13.6 after a few minutes (final temperature 15° C.). The dyestuff is and is identical with the control dyestuff obtainable from diazotized 2-aminonaphthalene-5-sulphonic acid and 1-hydroxynaphthalene-5-sulphonic acid.

In a similar manner the hydroxy-azo dyestuffs listed on the right hand side of the following table are obtained from the diazonium compounds of the aminonaphthalene compounds mentioned in each case on the left hand side by the action of sodium hydroxide solution. If required, the crude products are purified by re-dissolving or extraction.

| | | Colour of solution |
|---|---|---|
| ![naphthalene-NH2] | ![azo dye 1] | Brown-red (pyridine). |
| ![naphthalene NH2 #2] | ![azo dye 2] | Do. |
| ![NaO3S-naphthalene-NH2-SO3Na] | ![azo dye 3] | Red (water). |

During the corresponding reaction of the diazotized 2-aminonaphthalene-7-sulphonic acid, the resulting monoazo dyestuff of the formula

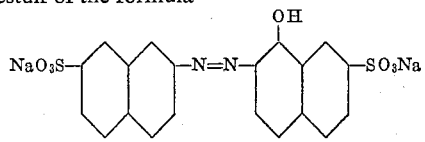

can be clearly detected in the course of the first hour after the reaction has started. After stirring overnight, further coupling has largely occurred to give the diazo dyestuff

Example 3

21.2 parts by weight (0.1 mol) of 1-benzoylamino-4-aminobenzene are diazotized as usual with 28 parts by volume of hydrochloric acid 19° Bé. and 6.9 parts by weight of sodium nitrite. The diazonium solution (appr. 700 parts by volume) is added at 0° C. to 55 parts by volume of 10 N sodium hydroxide solution. 41 parts by weight of sodium bicarbonate are added thereto while stirring. To the diazotate there is added the diazonium compound (appr. 700 parts by volume) prepared from 30.3 parts by weight (0.1 mol) of 2-aminonaphthalene-3,7-disulphonic acid, 28 parts by volume of hydrochloric acid 19° Bé. and 6.9 parts by weight of sodium nitrite. Dyestuff formation takes place rapidly at pH 9 with vigorous splitting off of nitrogen. The reaction is completed by stirring at room temperature. After two hours, the reaction product is heated to 80° C, separated out by the addition of sodium chloride and isolated at 80° C. The filtrate contains a small amount of the hydroxy-azo dyestuff described in Example 1 and formed from the diazonium compound of 2-aminonaphthalene-3,7-disulphonic acid only. The dried chief product is a dark powder which dissolves in water with a red colour, in concentrated sulphuric acid likewise with a red colour. It corresponds to the formula

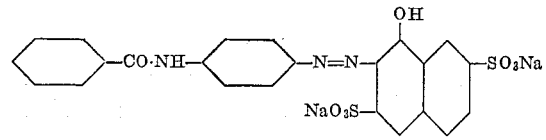

and is identical with the control dyestuff obtainable from diazotized 1-benzoylamino-4-aminobenzene and 1-hydroxynaphthalene - 3,7 - disulphonic acid. The yield amounts to about 90% of the theoretical.

The dyestuff dyes wool from an acid bath in red shades. The dyeings are distinguished by good fastness properties.

In a similar manner there are obtained with the diazotate component $R_1-N=N-O^{(-)}$

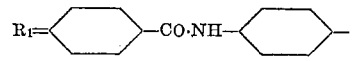

| | | Colour of solution |
|---|---|---|
| ![NaO3S-naphthalene-NH2-SO3Na] | ![azo OH SO3Na] | Red (water). |
| ![naphthalene-NH2-SO3Na] | ![azo OH] | Do. |
| ![naphthalene-NH2] | ![N=N-R1 OH] | Orange (pyridine). | the hydroxy-azo dyestuffs listed on the right hand side of the following table when the diazonium compound of the aminonaphthalene compound listed in each case on the left hand side is used as second component. If necessary, the reaction times are extended to stirring overnight.

In the two last mentioned experiments, the reaction is carried out without the addition of bicarbonate. When using 1-aminonaphthalene, a certain portion of the dyestuff formed according to Example 2 (table) from 1-aminonaphthalene only is contained in the isolated product. By increasing the molar proportion of diazotate and diazonium component (for example from 1:1 to 2:1) this portion may be substantially reduced.

*Example 4*

18.9 parts by weight (0.1 mol) of the sodium salt of 4-nitrophenyl-1-anti-diazotate are dissolved in 350 parts by volume of water and treated with 140 parts by volume of a 20% sodium carbonate solution. A diazonium compound (700 parts by volume) prepared in usual manner from 30.3 parts by weight (0.1 mol) of 2-aminonaphthalene-3,7-disulphonic acid is added to this mixture. The formation of the hydroxy-azo dystuff takes place with vigorous evolution of nitrogen. After termination of the reaction, the reaction product is separated out with sodium chloride and re-dissolved.

The same reaction product is obtained by using the anti-diazotate without a sodium carbonate solution and neutralising the diazonium suspension with bicarbonate before adding it.

After drying, the dyestuff is a dark red powder which dissolves in water with an orange-red colour. It corresponds to the formula

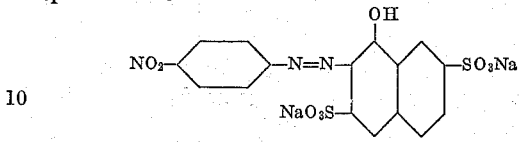

and is identical with the portion of o-hydroxyazo dyestuff formed in addition to a large amount of p-hydroxyazo dyestuff by coupling diazotized 4-nitroaniline with 1-hydroxynaphthalene-3,7-disulphonic acid. The yield is about 40% of the theoretical.

The o-hydroxyazo dyestuff produced according to the new process dyes wool from an acid bath in red shades. The dyeings are distinguished by good fastness properties.

In a similar manner there are obtained with the diazotate component $R_2-N=N-O^{(-)}$

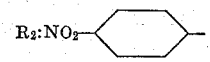

the hydroxyazo dyestuffs listed on the right hand side of the following table when the diazonium compound of the aminonaphthalene compound given in each case on the left hand side is used as second component.

| Aminonaphthalene | Hydroxyazo product | Colour of solution |
|---|---|---|
| 2-aminonaphthalene-3,7-disulphonic acid (NaO₃S–naphthalene–NH₂, –SO₃Na) | 1-hydroxy-2-(R₂-azo)naphthalene-3,7-disulphonic acid | Orange-red (water). |
| 2-aminonaphthalene-5-sulphonic acid | corresponding hydroxyazo compound | Do. |
| 2-amino-3-carboxynaphthalene | corresponding hydroxyazo compound | Red (water). |
| 1-aminonaphthalene-3,6-disulphonic acid | corresponding hydroxyazo compound | Orange (water). |
| 1-amino-8-hydroxy-naphthalene-3,6-disulphonic acid (NaO₃S, NH₂, SO₃Na) | corresponding hydroxyazo compound | Do. |
| 1-amino-8-phenylsulphonyloxy-naphthalene-3,6-disulphonic acid (NaO₃S, NH₂, O-SO₂·C₆H₅, SO₃Na) | corresponding hydroxyazo compound (N=N–R₂, OH) | Bluish red (water). |

| | | Colour of solution |
|---|---|---|
| ![naphthalene with NH2 and NaO3S] | ![naphthalene with N=N-R2, OH and NaO3S] | Red (water) |
| ![naphthalene with NH2 and SO3Na] | ![naphthalene with N=N-R2, OH and SO3Na] | Do. |
| ![naphthalene with NH2 and SO3Na] | ![naphthalene with N=N-R2, OH and SO3Na] | Do. |

Example 5

31.8 parts by weight (0.1 mol) of 4-sulphophenyl-1-syn-diazotate (used as disodium salt-tetrahydrate) are dissolved in 350 parts by volume of water and treated with 140 parts by volume of a 20% sodium carbonate solution. 700 parts by volume of a diazonium compound prepared in usual manner from 30.3 parts by weight (0.1 mole) of 2-aminonaphthalene-3,7-disulphonic acid are added to this mixture. The dyestuff formation takes place with splitting off of nitrogen. After completion of the reaction, the reaction product is precipitated with sodium chloride. The crude product contains a certain portion (about 30%) of the hydroxyazo dyestuff formed according to Example 1 from 2-aminonaphthalene-3,7-disulphonic acid only. By increasing the amount of diazotate to 0.13 mol the formation of this portion can be prevented and the desired o-hydroxyazo dyestuff isolated in the pure form. After drying, it is a dark brown powder which dissolves in water with an orange, in concentrated sulphuric acid with a red colour. The hydroxyazo dyestuff corresponds to the formula

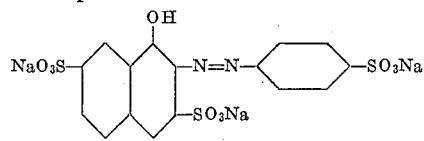

and is identical with the control dyestuff obtainable from diazotized 4-aminobenzene-1-sulphonic acid and 1-hydroxynaphthalene-3,7-disulphonic acid.

The same dyestuff can be obtained by using, instead of the syn-diazotate, the corresponding anti-diazotate.

Example 6

21.3 parts by weight (0.1 mol) of 2,5-dichlorophenyl-1-anti-diazotate (sodium salt) are dissolved in 350 parts by volume of water at 40° C. and treated at this temperature with 140 parts by volume of the diazonium compound prepared in usual manner from 30.3 parts by weight (0.1 mol) of 2-aminonaphthalene-3,7-disulphonic acid. After stirring overnight, the resulting dyestuff is isolated, re-dissolved and dried. It dissolves in water with an orange colour, in concentrated sulphuric acid with a red-violet colour. The dyestuff corresponds to the formula

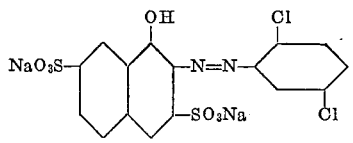

and is identical with the portion of o-hydroxyazo dyestuff of the control dyestuff obtainable by coupling diazotized 2,5-dichloraniline with 1-hydroxynaphthalene-3,7-disulphonic acid.

Example 7

41.6 parts by weight (0.15 mol) of 4-amino-1,1'-azobenzene-4'-sulphonic acid are diazotized in known manner. The suspension of the diazonium compound (appr. 2100 parts by volume) is added to 83 parts by volume of 10 N sodium hydroxide solution. To the resulting diazotate solution there are added first 61 parts by weight of sodium bicarbonate and then the suspension of the diazonium compound prepared as usual from 30.3 parts by weight (0.1 mol) of 2-aminonaphthalene-3,7-disulphonic acid. The resulting hydroxyazo dyestuff is precipitated with sodium chloride and isolated. After drying, it is a dark powder which dissolves in water with a red colour, in concentrated sulphuric acid with a blue colour. It corresponds to the formula

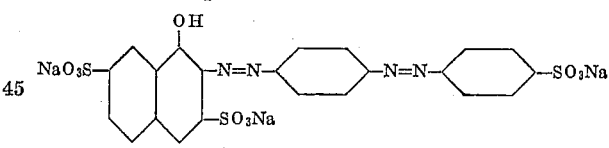

and is identical with the control dyestuff obtainable by coupling diazotized 4-amino-1,1'-azobenzene-4'-sulphonic acid and 1-hydroxynaphthalene-3,7-disulphonic acid.

Example 8

40.0 parts by weight (0.1 mol) of dehydrothiotoluidine-disulphonic acid are diazotized in usual manner. The suspension of the diazonium compound (appr. 850 parts by volume) is added to 55 parts by volume of 10 N sodium hydroxide solution and the resulting diazotate solution treated with 41 parts by weight of sodium bicarbonate and subsequently with the diazonium compound prepared from 30.3 parts by weight (0.1 mol) of 2-aminonaphthalene-4,7-disulphonic acid. The reaction is completed by heating the mixture to 60° C. and the reaction product salted out and isolated at this temperature.

After drying, the dyestuff is a dark red powder which dissolves in water with a red colour, in concentrated sulphuric acid with a violet colour. It corresponds to the formula

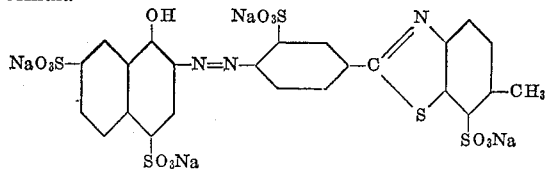

and is identical with the control dyestuff obtainable by coupling diazotized dehydro-thio-toluidine-disulphonic acid with 1-hydroxynaphthalene-4,7-disulphonic acid.

In a similar manner there are obtained the hydroxyazo dyestuffs listed in column 3 of the following table. The amine on which the diazotate is based is given in column 1, the amine on which the diazonium compound is based, is indicated in column 2.

When reacting the diazotate from 2-aminonaphthalene-6-sulphonic acid no bicarbonate is added.

dyestuff described in Example 3 and having the following constitution:

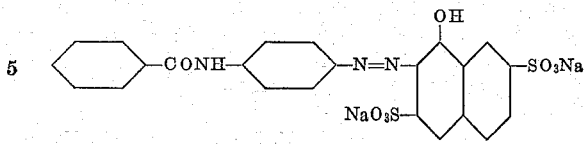

Also in this case, it was found to be identical with the control dyestuff obtainable by coupling diazotized 1-benzoylamino - 4 - aminobenzene and 1 - hydroxynaphthalene-3,7-disulphonic acid.

| | | | Colour of solution |
|---|---|---|---|
| [aniline] | [2-aminonaphthalene-x-sulphonic acid] | [azo dye product] | Red. |
| [o-anisidine] | [aminonaphthalenedisulphonic acid] | [azo dye product] | |
| [aminonaphthalenesulphonic acid] | [aminonaphthalenedisulphonic acid] | [azo dye product] | Red. |
| [nitro-aminobenzenesulphonic acid] | [aminonaphthalenedisulphonic acid] | [azo dye product] | Orange-red. |
| [aminoanthraquinone] | [aminonaphthalenesulphonic acid] | [azo dye product] | Red. |

Example 9

30.3 parts by weight (0.1 mol) of 2-aminonaphthalene-3,7-disulphonic acid are diazotized as usual with 28 parts by volume of hydrochloric acid 19° Bé. and 6.9 parts by weight of sodium nitrite. The diazonium solution (appr. 700 parts by volume) is added at room temperature to 55 parts by volume of 10 N sodium hydroxide solution. After 2–3 minutes, the diazonium solution prepared from 21.2 parts by weight (0.1 mol) of 1-benzoylamino-4-aminobenzene, 28 parts by volume of hydrochloric acid 19° Bé. and 6.9 parts by weight of sodium nitrite is added to the diazotate solution. The dyestuff is formed rapidly at pH 13.5 with vigorous splitting off of nitrogen. After 2 hours, the product is treated with acetic acid and salted out with 20% sodium chloride. This method of operation yields only a very small amount of the hydroxyazo dyestuff described in Example 1 and formed from 2-aminonaphthalene-3,7-disulphonic acid only.

The chief product is identical with the orthohydroxy

Example 10

38.3 parts by weight (0.1 mol) of 2-aminonaphthalene-3,6,8-trisulphonic acid are diazotized as usual with 28 parts by volume of hydrochloric acid 19° Bé. and 6.9 parts by volume of sodium nitrite. The diazonium compound (appr. 700 parts by volume) is added at room temperature to 55 parts by volume of 10 N sodium hydroxide solution. After 3 minutes, 41 parts by weight of sodium bicarbonate are added while stirring and immediately afterwards the diazonium solution prepared from 21.2 parts by weight (0.1 mol) of 1-benzoylamino-4-aminobenzene, 28 parts by volume of hydrochloric acid 19° Bé. and 6.9 parts by weight of sodium nitrite. The dyestuff formation proceeds rapidly with vigorous evolution of nitrogen. After 2 hours, the product is rendered acid to Congo and salted out with 20% sodium chloride. After drying, the dyestuff is a dark red powder which dissolves in water with a red colour, in concentrated sulphuric acid likewise with a red colour. It corresponds to the formula

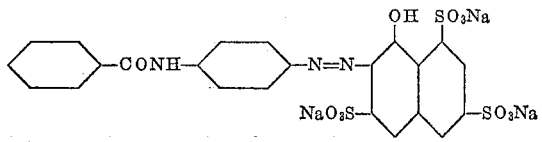

and is identical with the control dyestuff obtainable by coupling diazotized 1-benzoylamino-4-aminobenzene with 1-hydroxynaphthalene-3,6,8-trisulphonic acid.

*Example 11*

30.3 parts by weight of 2-aminonaphthalene-3,7-disulphonic acid are diazotized in usual manner with 28 parts by volume of hydrochloric acid 19° Bé. and 6.9 parts by weight of sodium nitrite. The diazonium solution (appr. 700 parts by volume) is added at room temperature to 55 parts by volume of 10 N sodium hydroxide solution. After 2–3 minutes, 41 parts by weight of sodium bicarbonate are added with stirring, and immediately thereafter the diazonium solution prepared from 13.8 parts by weight of 4-nitroaniline, 28 parts by volume of hydrochloric acid 19° Bé. and 6.9 parts by weight of sodium nitrite. The formation of the hydroxyazo dyestuff proceeds at pH 11 with vigorous evolution of nitrogen. After completion of the reaction, the product is treated with acetic acid, separated out with sodium chloride and re-dissolved.

It is identical with the hydroxyazo dyestuff described in Example 4 of the following formula

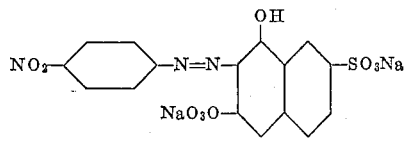

Also in this case, the dyestuff was moreover identified by the coupling product obtained from diazotized 4-nitroaniline and 1-hydroxynaphthalene-3,7-disulphonic acid.

*Example 12*

14.3 parts by weight (0.1 mol) of 1-aminonaphthalene are diazotized in usual manner. The diazonium solution (appr. 900 parts by volume) is added to 55 parts by volume of 10 N sodium hydroxide solution. After 2–3 minutes, the diazonium solution (appr. 700 parts by volume) prepared in usual manner from 21.2 parts by weight (0.1 mol) of 1-benzoylamino-4-aminobenzene is added thereto. After completion of the reaction, the pH is adjusted from 13.5 to 7 and the hydroxyazo dyestuff is isolated and, if desired, re-dissolved.

The reaction product is identical with the hydroxyazo dyestuff obtained according to Example 3 (table) from the diazotate of 1-benzoylamino-4-aminobenzene and the diazonium compound of 1-aminonaphthalene. It corresponds to the formula

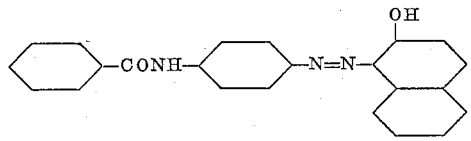

and was moreover identified by the control dyestuff obtained by coupling diazotized 1-benzoylamino-4-aminobenzene with 2-hydroxynaphthalene.

*Example 13*

30.3 parts by weight (0.1 mol) of 2-aminonaphthalene-3,7-disulphonic acid are diazotized in usual manner. The diazonium solution (700 parts by volume) is added at room temperature to 55 parts by volume of 10 N sodium hydroxide solution. After 2–3 minutes, 41 parts by weight of sodium bicarbonate are added to the diazotate solution and immediately afterwards the diazonium suspension (appr. 1400 parts by volume) prepared in usual manner from 27.7 parts by weight of 4-aminoazobenzene-4'-sulphonic acid. The resulting hydroxyazo dyestuff is salted out with 20% sodium chloride and can be further purified by re-dissolving. It corresponds to the formula

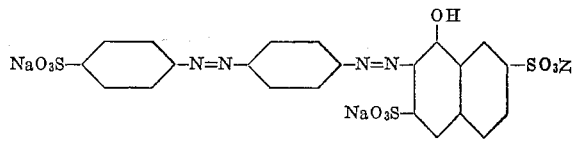

and is identical with the dyestuff described in Example 7 and with the control preparation obtained by coupling.

*Example 14*

30.3 parts by weight (0.1 mol) of 2-aminonaphthalene-3,7-disulphonic acid are diazotized as usual and added to 55 parts by volume of 10 N sodium hydroxide solution. After 2–3 minutes, 41 parts by weight of sodium bicarbonate are added while stirring and subsequently the diazonium solution from 23.3 parts by weight (0.1 mol) of 1-aminoanthraquinone (pH 7.6). After 2 hours, the resulting hydroxyazo dyestuff is isolated. It corresponds to the formula

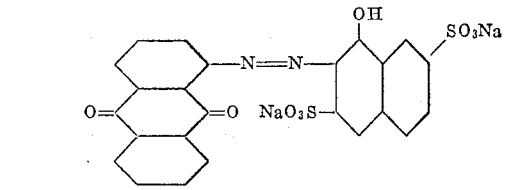

and is identical with the hydroxyazo dyestuff listed in Example 8 (table) and produced in inverse manner. It is also identical with the control dyestuff obtainable by coupling diazotized 1-aminoanthraquinone with 1-hydroxynaphthalene-3,7-disulphonic acid.

*Example 15*

22.3 parts by weight (0.1 mol) of 1-aminonaphthalene-4-sulphonic acid are diazotized as usual. The suspension of the diazonium compound (appr. 700 parts by volume) is added to 55 parts by volume of 10 N sodium hydroxide solution. After 2–3 minutes, 41 parts by weight of sodium bicarbonate solution are added while stirring and immediately afterwards the diazonium solution from 23.3 parts by weight (0.1 mol) of 1-aminoanthraquinone. The reaction proceeds with vigorous evolution of nitrogen and is soon completed. The product is heated to 80° C. and, after the addition of 15 percent by volume of sodium chloride, filtered off with suction while hot and re-dissolved.

After drying, the hydroxyazo dyestuff is a dark red powder which dissolves in a mixture of water and pyridine with a red colour, in sulphuric acid with a violet colour. It corresponds to the formula

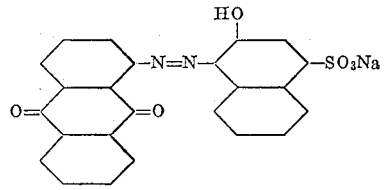

and is identical with the control dyestuff obtained by coupling diazotized 1-aminoanthraquinone with 2-hydroxynaphthalene-4-sulphonic acid.

*Example 16*

30.3 parts by weight (0.1 mol) of 2-aminonaphthalene-3,7-disulphonic acid are diazotized as usual and added to 55 parts by volume of 10 N sodium hydroxide solution. After 2–3 minutes, 41 parts by weight of sodium bicarbonate are added while stirring and then the diazonium solution prepared from 35.3 parts by weight (0.1 mol) of the compound

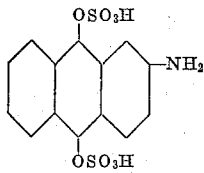 (VII)

The formation of the hydroxyazo dyestuff proceeds with vigorous evolution of nitrogen. The resulting product is separated out by salting out and re-dissolved.

After drying, the dyestuff is a dark powder which dissolves in water with a red colour, in concentrated sulphuric acid with a violet colour. It corresponds to the formula

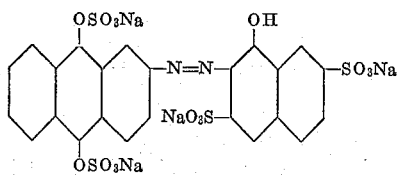

and is identical with the control dyestuff obtained by coupling the compound (VII) with 1-hydroxynaphthalene-3,7-disulphonic acid.

*Example 17*

30.3 parts by weight (0.1 mol) of 2-aminonaphthalene-3,7-disulphonic acid are diazotized as usual and added to 55 parts by volume of 10 N sodium hydroxide solution. The diazonium solution prepared from 21.0 parts by weight (0.1 mol) of 8-aminoquinoline-5-sulphonic acid is added after 2–3 minutes.

After completion of the reaction the product is rendered neutral with acetic acid, the hydroxyazo dyestuff separated out with sodium chloride and re-dissolved.

After drying, the dyestuff is a dark powder which dissolves in water with an orange-red colour, in concentrated sulphuric acid with a brown-red colour. It corresponds to the formula

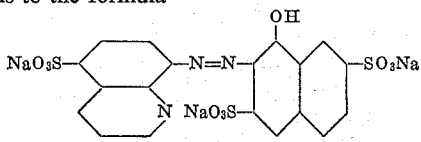

and is identical with the control dyestuff obtained by coupling diazotized 8-aminoquinoline-5-sulphonic acid with 1-hydroxynaphthalene-3,7-disulphonic acid.

*Example 18*

21.9 parts by weight (0.1 mol) of 2-methoxy-4-nitrophenyl-1-anti-diazotate (sodium salt) are dissolved in 350 parts by volume of water at 40° C. The solution is filtered and treated at room temperature with the diazonium compound (appr. 1400 parts by volume) prepared from 22.3 parts by weight (0.1 mol) of 2-aminonaphthalene-3-sulphonic acid, 28 parts by volume of hydrochloric acid 19° Bé. and 6.9 parts by weight of sodium nitrite. The hydroxyazo dyestuff is formed with the evolution of gas and can be separated out by the addition of sodium chloride.

The dried dyestuff is a dark red powder which dissolves in a mixture of water and pyridine with a red colour, in concentrated sulphuric acid with a violet colour.

It corresponds to the formula

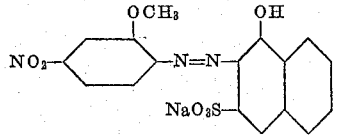

and is identical with the control dyestuff obtainable from diazotized 1-amino-2-methoxy-4-nitrobenzene and 1-hydroxynaphthalene-3-sulphonic acid.

*Example 19*

20.8 parts by weight (0.1 mol) of 2-methoxy-5-chlorophenyl-1-anti-diazotate (sodium salt) are dissolved in 350 parts by volume of water at 40° C. The solution is filtered and treated at room temperature with the diazonium compound (appr. 1400 parts by volume) prepared from 22.3 parts by weight (0.1 mol) of 2-aminonaphthalene-3-sulphonic acid, 28 parts by volume of hydrochloric acid 19° Bé. and 6.9 parts by weight of sodium nitrite. The hydroxyazo dyestuff is formed at pH 9.1 with the evolution of gas and can be separated out by the addition of sodium chloride.

After drying, the dyestuff is a red powder which dissolves in a mixture of water and pyridine with a red colour, in concentrated sulphuric acid with a bluish violet colour.

It corresponds to the formula

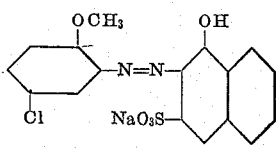

and is identical with the control dyestuff obtainable from diazotized 1-amino-2-methoxy-4-chlorobenzene and 1-hydroxynaphthalene-3-sulphonic acid.

*Example 20*

21.9 parts by weight (0.1 mol) of 2-methoxy-4-nitrophenyl-1-antidiazotate (sodium salt) are dissolved in 350 parts by volume of water at 40° C. The solution is filtered and treated at room temperature with the diazonium compound (appr. 700 parts by volume) prepared in usual manner from 30.3 parts by weight (0.1 mol) of 2-aminonaphthalene-3,7-disulphonic acid. The dyestuff is formed at pH 5.8 with vigorous evolution of nitrogen. When the evolution of gas has subsided, stirring is continued for another hour, the dyestuff is then separated out with sodium chloride and re-dissolved.

The dried dyestuff is a dark red powder which dissolves in water with a red colour, in concentrated sulphuric acid with a violet colour.

It corresponds to the formula

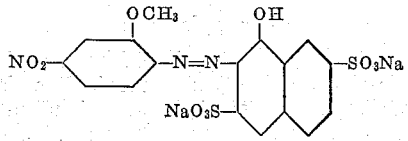

and is identical with the control dyestuff obtained by coupling diazotized 1-amino-2-methoxy-4-nitrobenzene with 1-hydroxynaphthalene-3,7-disulphonic acid.

When using 2-aminonaphthalene-5,7-disulphonic acid instead of 2-aminonaphthalene-3,7-disulphonic acid, there is obtained the hydroxyazo dyestuff.

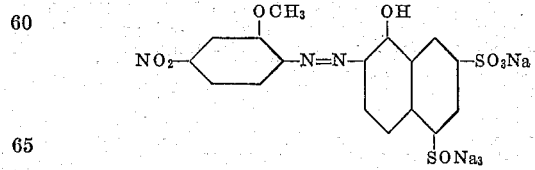

which, after drying, is a dark red powder dissolving in water with a red colour, in concentrated sulphuric acid with a blue-violet colour. It is identical with the control dyestuff obtained by coupling diazotized 1-amino-2-methoxy-4-nitrobenzene with 1-hydroxynaphthalene-5,7-disulphonic acid.

*Example 21*

20.8 parts by weight (0.1 mol) of 2-methoxy-5-chlorophenyl-1-anti-diazotate (sodium salt) are dissolved in 350 parts by volume of water at 40° C. The solution is filtered and treated at room temperature with the diazonium compound (700 parts by volume) prepared in usual manner from 30.3 parts by weight (0.1 mol) of 2-aminonaphthalene-3,7-disulphonic acid. After completion of the reaction, the reaction product is separated out with sodium chloride and redissolved. The dried dyestuff is a red powder which dissolves in water with a red colour, in concentrated sulphuric acid with a bluish violet colour.

It corresponds to the formula

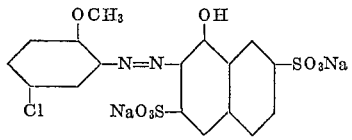

and is identical with the control dyestuff obtained by coupling diazotized 1-amino-2-methoxy-5-chlorobenzene with 1-hydroxynaphthalene-3,7-disulphonic acid.

Example 22

18.9 parts by weight (0.1 mol) of the sodium salt of 4-nitrophenyl-1-anti-diazotate are dissolved in 700 parts by volume of water and treated with 140 parts by volume of a 20% sodium carbonate solution. The diazonium compound (1400 parts by volume) prepared in usual manner from 22.3 parts by weight (0.1 mol) of 2-aminonaphthalene-3-sulphonic acid is added to this mixture. The formation of the hydroxyazo dyestuff proceeds with vigorous evolution of nitrogen. After several hours the reaction product is separated out with sodium chloride.

After drying, the dyestuff is a dark red powder which dissolves in a mixture of water and pyridine with an orange-yellow colour, in concentrated sulphuric acid with a red colour.

It corresponds to the formula

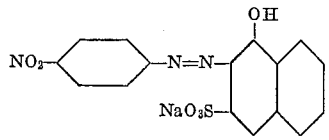

and is identical with the control dyestuff obtainable by coupling diazotized 4-nitroaniline with 1-hydroxynaphthalene-3-sulphonic acid.

Example 23

22.3 parts by weight (0.1 mol) of 2-aminonaphthalene-3-sulphonic acid are diazotized as usual. The diazonium compound (appr. 1400 parts by volume) is added at room temperature to 55 parts by volume of 10 N sodium hydroxide solution and the diazonium solution (700 parts by volume) prepared as usual from 21.2 parts by weight (0.1 mol) of 1-benzoylamino-4-aminobenzene is added immediately afterwards. The dyestuff formation proceeds at pH 12.9 with vigorous evolution of gas. After a short time, the product can be salted out.

The dry dyestuff is a dark red powder which dissolves in a mixture of water and pyridine with a red colour, in concentrated sulphuric acid with a dark red colour.

It corresponds to the formula

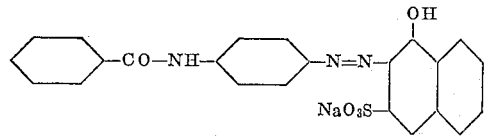

and is identical with the control dyestuff obtainable by coupling diazotized 1-benzoylamino-4-aminobenzene with 1-hydroxynaphthalene-3-sulphonic acid.

Example 24

22.3 parts by weight (0.1 mol) of 2-aminonaphthalene-3-sulphonic acid are diazotized with 28 parts by volume of hydrochloric acid 19° Bé. and 6.9 parts by weight of sodium nitrite. The diazonium compound (appr. 1400 parts by volume) is added at room temperature to 55 parts by volume of 10 N sodium hydroxide solution. After 3 minutes, 41 parts by weight of sodium bicarbonate are added with stirring and immediately afterwards the diazonium solution (appr. 700 parts by volume) prepared from 38.3 parts by weight (0.1 mol) of 2-aminonaphthalene-3,6,8-trisulphonic acid, 28 parts by volume of hydrochloric acid 19° Bé. and 6.9 parts by weight of sodium nitrite. The dyestuff formation takes place with the evolution of gas. After 2 hours, the product is salted out with 20% sodium chloride and re-dissolved.

After drying, the dyestuff is a red powder which dissolves in water with an orange-red colour, in concentrated sulphuric acid with a violet colour.

It corresponds to the formula

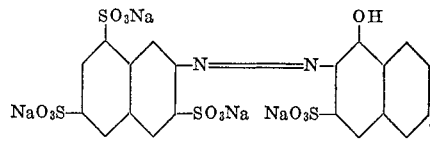

and is identical with the control dyestuff obtainable by coupling diazotized 2-aminonaphthalene-3,6,8-trisulphonic acid with 1-hydroxynaphthalene-3-sulphonic acid.

Example 25

30.3 parts by weight (0.1 mol) of 2-aminonaphthalene-3,7-disulphonic acid are diazotized in usual manner. The diazonium compound (700 parts by volume) is added at room temperature to 55 parts by volume of 10 N sodium hydroxide solution and subsequently the diazonium compound prepared from 22.3 parts by weight (0.1 mol) of 1-aminonaphthalene-3-sulphonic acid is added thereto.

After completion of the reaction, the hydroxyazo dyestuff is separated out with sodium chloride and re-dissolved.

After drying, it is a dark powder which dissolves in water with a red colour, in concentrated sulphuric acid with a blue colour.

It corresponds to the formula

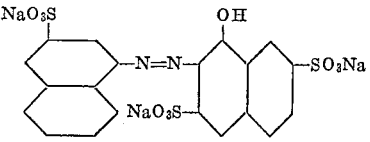

and is identical with the control dyestuff obtainable by coupling diazotized 1-aminonaphthalene-3-sulphonic acid with 1-hydroxynaphthalene-3,7-disulphonic acid.

Example 26

30.3 parts by weight (0.1 mol) of 2-aminonaphthalene-3,7-disulphonic acid are diazotized in usual manner. The diazonium compound (700 parts by volume) is added at room temperature to 55 parts by volume of 10 N sodium hydroxide solution. After 3 minutes there are added 41 parts by weight of sodium bicarbonate and the diazonium suspension (700 parts by volume) prepared in usual manner from 22.3 parts by weight (0.1 mol) of 2-aminonaphthalene-5-sulphonic acid.

The resulting hydroxyazo dyestuff is salted out at pH 10 and re-dissolved.

After drying, it is a dark powder which dissolves in water with an orange-red colour, in concentrated sulphuric acid with a red-violet colour. It corresponds to the formula

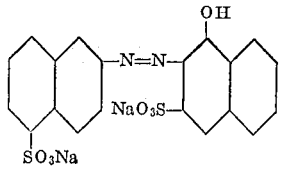

and is identical with the control preparation obtained by coupling diazotized 2-aminonaphthalene-5-sulphonic acid with 1-hydroxynaphthalene-3,7-disulphonic acid.

When replacing 2-aminonaphthalene-5-sulphonic acid by 2-aminonaphthalene-6-sulphonic acid, there is obtained in a similar manner the hydroxyazo dyestuff

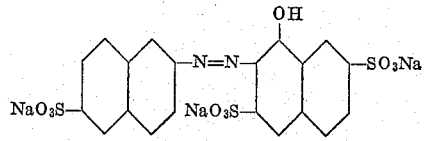

After drying, it is a dark powder which dissolves in water with a red colour, in concentrated sulphuric acid with a violet colour. It is identical with the control dyestuff obtainable by coupling diazotized 2-aminonaphthalene-6-sulphonic acid with 1-hydroxynaphthalene-3,7-disulphonic acid.

*Example 27*

30.3 parts by weight (0.1 mol) of 2-aminonaphthalene-3,7-disulphonic acid are diazotized in usual manner (700 parts by volume) and added at room temperature to 55 parts by volume of 10 N sodium hydroxide solution. After 3 minutes there are added with stirring 41 parts by weight of sodium bicarbonate and immediately afterwards the diazonium compound (700 parts by volume) prepared in usual manner from 30.3 parts by weight (0.1 mol) of 2-aminonaphthalene-5,7-disulphonic acid. After several hours, the hydroxyazo dyestuff can be salted out with sodium chloride and purified by re-dissolving.

After drying, it is a dark red powder which dissolves in water with an orange colour, in concentrated sulphuric acid with a red colour.

The dyestuff corresponds to the formula

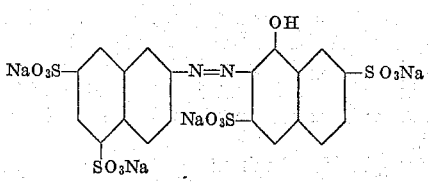

and is identical with the control dyestuff obtainable by coupling diazotized 2-aminonaphthalene-5,7-disulphonic acid with 1-hydroxynaphthalene-3,7-disulphonic acid.

*Example 28*

30.3 parts by weight (0.1 mol) of 2-aminonaphthalene-3,7-disulphonic acid are diazotized in usual manner. The diazonium compound (700 parts by volume) is added at room temperature to 55 parts by volume of 10 N sodium hydroxide solution. After 3 minutes, the alkaline solution is treated with 41 parts by weight of sodium bicarbonate. The diazonium solution prepared from 38.3 parts by weight (0.1 mol) of 2-aminonaphthalene-3,6,8-trisulphonic acid is added thereto.

Dyestuff formation sets in immediately with vigorous foaming. The hydroxyazo dyestuff is salted out with sodium chloride.

After drying, it is a dark red powder which dissolves in water with an orange-red, in concentrated sulphuric acid with a violet colour.

It corresponds to the formula

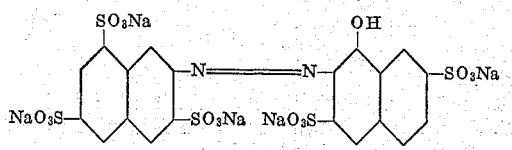

and is identical with the control dyestuff obtained by coupling diazotized 2-aminonaphthalene-3,6,8-trisulphonic acid with 1-hydroxynaphthalene-3,7-disulphonic acid.

*Example 29*

30.3 parts by weight (0.1 mol) of 2-aminonaphthalene-3,7-disulphonic acid are diazotized as usual. The diazonium compound (700 parts by volume) is added at room temperature to 55 parts by volume of 10 N sodium hydroxide solution. After 3 minutes, the alkaline solution is treated with 41 parts by weight of sodium bicarbonate and subsequently the diazonium compound (1200 parts by volume) prepared in usual manner from 34.8 parts by weight (0.1 mol) of 6-nitro-2-aminonaphthalene-4,8-disulphonic acid is added thereto.

The hydroxyazo dyestuff is formed with slight evolution of gas and can be salted out after several hours with sodium chloride.

After drying, the dyestuff is a dark red powder which dissolves in water with an orange-red colour, in concentrated sulphuric acid with a red colour.

It corresponds to the formula

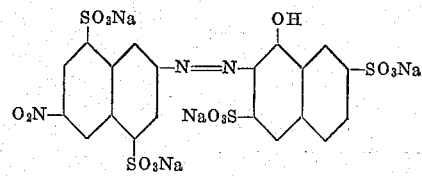

and is identical with the control preparation obtained by coupling diazotized 6-nitro-2-aminonaphthalene-4,8-disulphonic acid with 1-hydroxynaphthalene-3,7-disulphonic acid.

*Example 30*

38.3 parts by weight (0.1 mol) of 2-aminonaphthalene-3,6,8-trisulphonic acid are diazotized in usual manner. The diazonium solution (700 parts by volume) is added at room temperature to 55 parts by volume of 10 N sodium hydroxide solution; after 3 minutes, the alkaline solution is treated with 41 parts by weight of sodium bicarbonate. Immediately afterwards, the diazonium compound (700 parts by volume) prepared in usual manner from 22.3 parts by weight (0.1 mol) of 2-aminonaphthalene-5-sulphonic acid is added thereto.

After completeion of the reaction, the product is rendered distinctly acid to Congo with hydrochloric acid and the hydroxyazo dyestuff separated out with sodium chloride. It has to be re-dissolved for further purification.

The dried dyestuff is a dark powder which dissolves in water with a red colour, in concentrated sulphuric acid with a violet colour.

It corresponds to the formula

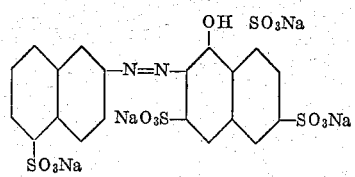

and is identical with the control dyestuff obtained by coupling of diazotized 2-aminonaphthalene-5-sulphonic acid with 1-hydroxynaphthalene-3,6,8-trisulphonic acid.

In addition, there is always formed a smaller amount of another hydroxyazo dyestuff which is identical with the coupling product from 2-aminonaphthalene-3,6,8-trisulphonic acid and 1-hydroxynaphthalene-5-sulphonic acid and therefore corresponds to the formula

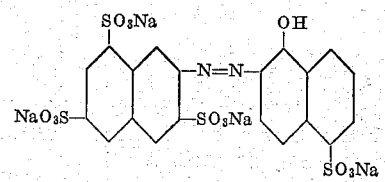

Example 31

30.3 parts by weight (0.1 mol) of 1-aminonaphthalene-4,8-disulphonic acid are diazotized as usual. The diazonium compound (700 parts by volume) is added at room temperature to 55 parts by volume of 10 N sodium hydroxide solution. After 3 minutes, there are added 41 parts by weight of sodium bicarbonate and subsequently the diazonium solution prepared in usual manner from 21.2 parts by weight (0.1 mol) of 1-benzoylamino-4-aminobenzene. The dyestuff formation proceeds with vigorous foaming. After 2 hours, the dyestuff can be salted out, isolated and re-dissolved.

The dried dyestuff is a dark red powder which dissolves in a mixture of water and pyridine with a light red colour, in concentrated sulphuric acid with a red-brown colour.

It corresponds to the formula

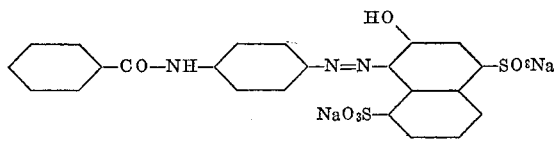

and is identical with the control preparation obtained by coupling diazotized 1-benzoylamino-4-aminobenzene with 2-hydroxynaphthalene-4,8-disulphonic acid.

Instead of 1-aminonaphthalene-4,8-disulphonic acid there may also be used 1-aminonaphthalene-6,8-disulphonic acid or 1-aminonaphthalene-3,6,8-trisulphonic acid. The resulting dyestuffs are

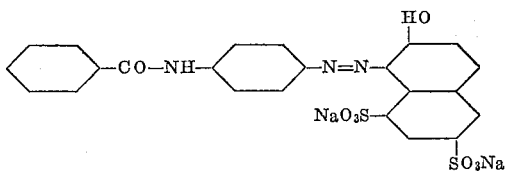

and

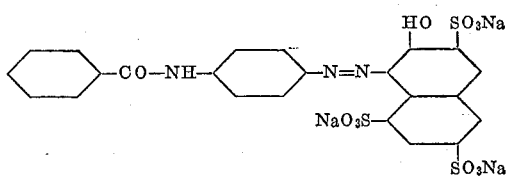

respectively.

After drying, they are dark powders which dissolve in water with an orange-yellow or orange-red colour, in concentrated sulphuric acid with a yellow-brown or red-brown colour respectively.

They are identical with the control dyestuffs obtained by coupling diazotized 1-benzoylamino-4-aminobenzene with 2-hydroxynaphthalene-6,8-disulphonic acid and with 2-hydroxynaphthalene-3,6,8-trisulphonic acid respectively.

Example 32

30.3 parts by weight (0.1 mol) of 1-aminonaphthalene-6,8-disulphonic acid are diazotized in usual manner. The diazonium compound (appr. 700 parts by volume) is added at room temperature to 55 parts by volume of 10 N sodium hydroxide solution. After 2–3 minutes, 41 parts by weight of sodium bicarbonate are added and subsequently the diazonium solution prepared in usual manner from 13.8 parts by weight of 4-nitroaniline.

After a few hours, the hydroxyazo dyestuff can be salted out, isolated and re-dissolved.

After drying, it is a red powder which dissolves in water with a yellow colour, in concentrated sulphuric acid with an orange-yellow colour.

It corresponds to the formula

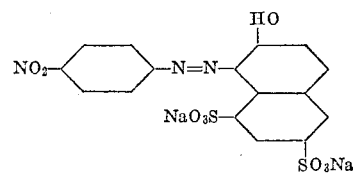

and is identical with the control dyestuff obtained by coupling diazotized 4-nitroaniline with 2-hydroxynaphthalene-6,8-disulphonic acid.

Instead of 1-aminonaphthalene-6,8-disulphonic acid there may also be used 1-aminonaphthalene-4,8-disulphonic acid; in this case, the dyestuff

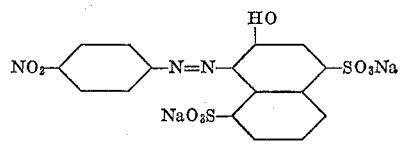

is obtained.

Example 33

21.2 parts by weight (0.1 mol) of 1-benzoylamino-4-aminobenzene are diazotized as usual and added at room temperature to 55 parts by volume of 10 N sodium hydroxide solution. After about 2 minutes, there are added simultaneously 41 parts by weight of sodium bicarbonate and the diazonium suspension (700 parts by volume) prepared from 36.0 parts by weight (0.1 mol) of 2-acetylamino-5-aminonaphthalene-4,8-disulphonic acid. Dyestuff formation proceeds instantaneously with vigorous evolution of gas. After only a short time, the hydroxyazo dyestuff may be isolated without the addition of salt.

The dried dyestuff is a dark red powder which dissolves in a mixture of water and pyridine with a bluish red colour, in concentrated sulphuric acid with a red colour.

It corresponds to the formula

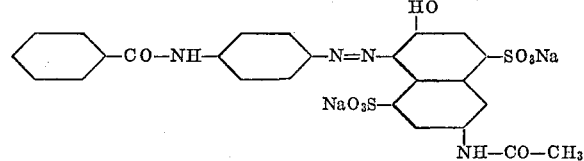

The compound is obtained in a yield of 75 to 80% of the theoretical.

We claim:

1. A process for the production of ortho-hydroxy azo compounds which consists in reacting a diazotate of the formula

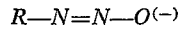

wherein R is a member selected from the group consisting of a compound of the benzene and naphthalene series; with a diazonium compound of the formula

wherein $R_1$ is a member selected from the group consisting of a component of the benzene and naphthalene series, at least one of R and $R_1$ being of the naphthalene series; the reaction being carried out at a pH of about 9–12 and at a temperature of about 0°–60° C.

2. A process according to claim 1 in which the temperature range is 0° C. to 25° C.

3. A process according to claim 1 comprising reacting said diazotate and said diazonium compound in an organic solvent.

4. A process according to claim 1 in which the diazotate is a syn-diazotate.

References Cited by the Examiner

UNITED STATES PATENTS 1,922,463  8/33  Turski _____ 260—159 XR
2,243,213  5/41  Kranzlein _____ 260—144 XR

OTHER REFERENCES

Hodgson et al.: Jour. Chem. Soc. (London) (1943), pp. 379–380.

CHARLES B. PARKER, *Primary Examiner*.
LEON ZITVER, *Examiner*.

UNITED STATES PATENT OFFICE
CERTIFICATE OF CORRECTION

Patent No. 3,202,651

August 24, 1965

Fritz Suckfüll et al.

It is hereby certified that error appears in the above numbered patent requiring correction and that the said Letters Patent should read as corrected below.

Column 4, lines 71 to 75, the formula should appear as shown below instead of as in the patent:

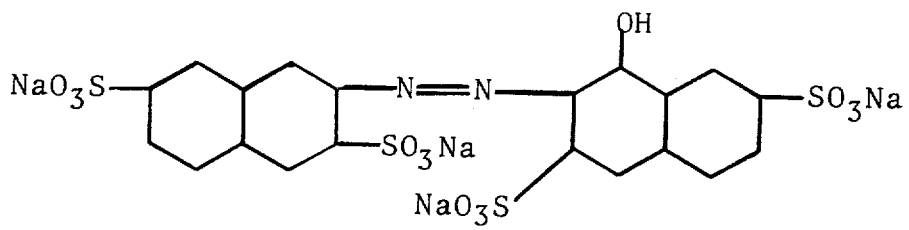

Signed and sealed this 7th day of June 1966.

(SEAL)
Attest:

ERNEST W. SWIDER
Attesting Officer

EDWARD J. BRENNER
Commissioner of Patents